United States Patent
Kanae et al.

(10) Patent No.: US 6,982,302 B2
(45) Date of Patent: *Jan. 3, 2006

(54) MOLDING FOR AUTOMOBILE

(75) Inventors: Kentarou Kanae, Yokkaich (JP);
Toshiyuki Hayakawa, Yokkaichi (JP);
Minoru Tanaka, Yokkaichi (JP);
Akihiko Morikawa, Yokkaichi (JP)

(73) Assignee: JSR Corporation, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 10/505,882

(22) PCT Filed: Dec. 24, 2003

(86) PCT No.: PCT/JP03/16631

§ 371 (c)(1),
(2), (4) Date: Sep. 3, 2004

(87) PCT Pub. No.: WO2004/060992

PCT Pub. Date: Jul. 22, 2004

(65) Prior Publication Data

US 2005/0096437 A1   May 5, 2005

(30) Foreign Application Priority Data

Dec. 27, 2002   (JP)   ............................ 2002-379678

(51) Int. Cl.
    *C08F 8/42*   (2006.01)
(52) U.S. Cl. ................ 525/329.5; 525/196; 525/331.7; 525/919; 526/281; 526/336; 428/220; 428/441; 428/461; 428/462; 428/521
(58) Field of Classification Search ............ 525/329.5, 525/196, 331.7, 919; 428/220, 441, 461, 428/462, 521; 526/281, 336
See application file for complete search history.

(56) References Cited

U.S. PATENT DOCUMENTS

| | | | |
|---|---|---|---|
| 6,060,551 A * | 5/2000 | Ooyama et al. | ............ 524/490 |
| 6,534,586 B2 | 3/2003 | Tsuji et al. | |
| 6,653,401 B2 * | 11/2003 | Kinoshita et al. | ............. 525/70 |
| 6,670,426 B2 | 12/2003 | Kanae et al. | |
| 6,803,423 B2 | 10/2004 | Hayakawa et al. | |
| 2001/0016620 A1 * | 8/2001 | Itoh et al. | ................... 524/528 |

FOREIGN PATENT DOCUMENTS

| | | |
|---|---|---|
| EP | 1180534 | 2/2002 |
| JP | 5-1186 | 1/1993 |
| JP | 5-279489 | 10/1993 |
| JP | 5-320447 | 12/1993 |
| JP | 6-9838 | 1/1994 |
| JP | 2000-191864 | 7/2000 |
| JP | 2000-302928 | 10/2000 |
| JP | 2002-20563 | 1/2002 |

OTHER PUBLICATIONS

U.S. Appl. No. 10/505,882, filed Sep. 3, 2004, Kanae et al.
U.S. Appl. No. 10/489,312, filed Sep. 28, 2004, Morikawa et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

An automotive molding, which is excellent in scratching resistance, has high gloss, and is excellent in weathering resistance. The automotive molding of the invention has a part composed of an elastomer material containing an olefinic random copolymer obtained by copolymerizing ethylene, an α-olefin having 3 to 10 carbon atoms and an unsaturated monomer having a functional group, and optionally a non-conjugated diene, and a metal ion for crosslinking the olefinic random copolymer.

16 Claims, No Drawings

MOLDING FOR AUTOMOBILE

TECHNICAL FIELD

The present invention relates to an automotive molding, and particularly to an automotive molding having a part composed of an olefinic thermoplastic elastomer.

BACKGROUND ART

Various automotive moldings are required to have performance such as excellent scratching resistance and weather resistance and high gloss equivalent to surrounding parts. Polyvinyl chloride has heretofore been widely used as a material for forming various automotive moldings.

However, polyvinyl chloride involves a problem from the environmental point of view because it is difficult to recycle and generates chlorine gas when burned. Under the circumstances, it is investigated to use an olefinic resin material, olefinic thermoplastic elastomer material or the like as a material for forming the automotive molding in place of polyvinyl chloride (see, for example, the following Prior Art 1 and Prior Art 2).

However, conventionally known olefinic resin materials and olefinic thermoplastic elastomer materials are low in resistance to surface scratching (scratching resistance). Since olefin resins are low in gloss, differences in appearance is acknowledged between the automotive molding and surrounding parts at a position where the molding is installed. As described above, the conventional olefinic resin materials and olefinic thermoplastic elastomer materials do not sufficiently satisfy the performance required of the automotive moldings.

Prior Art 1: JP-A-2000-26668;
Prior Art 2: JP-A-2001-128970.

DISCLOSURE OF THE INVENTION

The present invention has been made on the basis of the foregoing circumstances and has as its object the provision of an automotive molding, which has excellent scratching resistance, high gloss and excellent weather resistance.

According to the present invention, there is provided an automotive molding comprising a part composed of an elastomer material containing an olefinic random copolymer obtained by copolymerizing ethylene, an α-olefin having 3 to 10 carbon atoms and an unsaturated monomer having a functional group, and optionally a non-conjugated diene, and a metal ion for crosslinking the olefinic random copolymer.

In the automotive molding according to the present invention, the unsaturated monomer having a functional group for obtaining the olefinic random copolymer is a functional cyclic compound represented by the following general formula (1):

General formula (1)

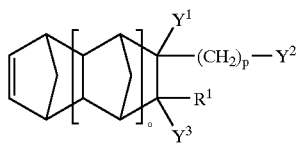

wherein in the general formula (1), $R^1$ means a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH, and when at least two of $Y^1$, $Y^2$ and $Y^3$ are —COOH, they may be bonded to each other to form an acid anhydride (—CO—(O)—CO—), o is an integer of 0 to 2, and p is an integer of 0 to 5.

In the automotive molding according to the present invention, the elastomer material may further contain a polymeric compound selected from a thermoplastic resin, a thermoplastic elastomer and rubber and/or a softening agent.

The part composed of the elastomer material may preferably be a facing material.

The automotive molding according to the present invention may preferably be applied to a door belt molding, side molding, step molding, roof molding, roof drip molding, front window molding, quarter window molding, hood top molding, rear window molding, glass run channel or bumper molding.

EFFECTS OF THE INVENTION

Since the automotive molding according to the present invention is formed by the specific elastomer material having excellent scratching resistance and weathering resistance, high gloss, and moreover good rubber elasticity and mechanical properties, it can preferably be applied to a door belt molding, side molding, step molding, roof molding, roof drip molding, front window molding, quarter window molding, hood top molding, rear window molding, glass run channel or bumper molding.

BEST MODE FOR CARRYING OUT THE INVENTION

The embodiments of the present invention will hereinafter be described in detail.

The automotive molding according to the present invention has a part composed of an elastomer material (hereinafter referred to as "specific elastomer material") containing an olefinic random copolymer (hereinafter referred to as "specific functional group-containing copolymer") obtained by copolymerizing at least ethylene, an α-olefin having 3 to 10 carbon atoms and a compound having a functional group, and a metal ion for crosslinking the specific functional group-containing copolymer.

[Specific Functional Group-containing Copolymer]

In the specific functional group-containing copolymer composing the automotive molding according to the present invention, ethylene is used as an essential monomer component.

A proportion of ethylene used is preferably 35 to 94.99 mol %, more preferably 40 to 89.99 mol %, particularly preferably 45 to 84.99 mol % based on all the monomer components.

If the proportion of ethylene used is lower than 35 mol %, it may be difficult in some cases to copolymerize a functional cyclic compound, which will be described subsequently. If the proportion of ethylene used exceeds 94.99 mol % on the other hand, it may be difficult in some cases to obtain rubber elasticity required of the elastomer material.

In the specific functional group-containing copolymer, the α-olefin (hereinafter referred to "specific α-olefin") having 3 to 10 carbon atoms is used as an essential monomer. The use of an α-olefin having at most 10 carbon atoms improves copolymerizability of the α-olefin with other monomers.

As specific examples of the specific α-olefin, may be mentioned propylene, 1-butene, 1-pentene, 4-methyl-pentene-1,1-hexene, 1-heptene, 1-octene and 1-decene. Among these, propylene, 1-butene, 1-hexene and 1-octene are preferred, with propylene and 1-butene being more preferred.

These compounds may be used either singly or in any combination thereof.

A proportion of the specific α-olefin used is preferably 5 to 50 mol %, more preferably 10 to 45 mol %, particularly preferably 15 to 40 mol % based on all the monomer components.

If the proportion of the specific α-olefin used is lower than 5 mol %, it may be difficult in some cases to obtain rubber elasticity required of the elastomer material. If the proportion of the specific α-olefin used exceeds 50 mol % on the other hand, the durability of the resulting elastomer material may become low.

In the specific functional group-containing copolymer, an unsaturated monomer (hereinafter referred to as "functional group-containing unsaturated monomer") having a functional group capable of being crosslinked with a metal ion is used as an essential monomer component. This functional group-containing unsaturated monomer preferably has a carboxyl group, hydroxyl group, epoxy group or sulfonic group as the functional group. As such a functional group-containing unsaturated monomer, may preferably be used a functional cyclic compound (hereinafter referred to as "specific functional cyclic compound") represented by the general formula (1).

In the general formula (1) representing the specific functional cyclic compound, $R^1$ is a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH. When at least two of $Y^1$, $Y^2$ and $Y^3$ are —COOH, they may be bonded to each other to form an acid anhydride (—CO—(O)—CO—).

As specific examples of the hydrocarbon group having 1 to 10 carbon atoms, may be mentioned methyl, ethyl, propyl, butyl, pentyl, hexyl, heptyl, octyl, nonyl and decyl groups.

The number o of repetitions is an integer of 0 to 2. If the number o of repetitions is 3 or greater, it may be difficult in some cases to copolymerize such a cyclic compound with other monomers. The number p of repetitions is an integer of 0 to 5.

Such a specific functional cyclic compound can be prepared by condensation of cyclopentadiene with a functional group-containing unsaturated compound in accordance with the Diels-Alder reaction.

As specific examples of the specific functional cyclic compound, may be mentioned:
5,6-dimethyl-5,6-dicarboxy-bicyclo[2.2.1]-2-heptene,
5,6-diethyl-5,6-dicarboxy-bicyclo[2.2.1]-2-heptene,
5,6-dimethyl-5,6-bis(carboxymethyl)-bicyclo[2.2.1]-2-heptene,
5,6-diethyl-5,6-bis(carboxymethyl)-bicyclo[2.2.1]-2-heptene,
5-methyl-5-carboxy-bicyclo[2.2.1]-2-heptene,
5-ethyl-5-carboxy-bicyclo[2.2.1]-2-heptene,
5-carboxy-5-carboxymethyl-bicyclo[2.2.1]-2-heptene,
5-methyl-5-carboxymethyl-bicyclo[2.2.1]-2-heptene,
5-ethyl-5-carboxymethyl-bicyclo[2.2.1]-2-heptene,
8,9-dimethyl-8,9-dicarboxy-tetracyclo-[4.4.0.1$^{2,5}$.1$^{7,10}$]-3-dodecene,
8,9-diethyl-8,9-dicarboxy-tetracyclo-[4.4.0.1$^{2,5}$.1$^{7,10}$]-3-dodecene,
8-methyl-8-carboxy-tetracyclo-[4.4.0.1$^{2,5}$.1$^{7,10}$]-3-dodecene, and
8-ethyl-8-carboxy-tetracyclo-[4.4.0.1$^{2,5}$.1$^{7,10}$]-3-dodecene.

A proportion of the functional group-containing unsaturated monomer used is preferably 0.01 to 5 mol %, more preferably 0.01 to 4 mol % based on all the monomer components.

If the proportion of the functional group-containing unsaturated monomer used is lower than 0.01 mol %, the resulting olefinic thermoplastic elastomer is low in crosslink density and tends to have low mechanical strength and scratching resistance. If the proportion of the functional group-containing unsaturated monomer used exceeds 5 mol % on other hand, the resulting olefinic thermoplastic elastomer is too high in crosslink density and has a possibility that its flowability may be deteriorated. It is hence not preferable to use the functional group-containing unsaturated monomer in such a too low or high proportion.

In the specific functional group-containing copolymer, a non-conjugated diene may be used as an optional monomer component in addition to the above-described essential monomer components.

As specific examples of the non-conjugated diene, may be mentioned linear acyclic dienes such as 1,4-hexadiene, 1,6-hexadiene and 1,5-hexadiene, branched acyclic dienes such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene and dihydromyrcene, and alicyclic dienes such as tetrahydroindene, methyltetrahydroindene, dicyclopentadiene, dicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene and 5-vinyl-2-norbornene. These compounds may be used either singly or in any combination thereof.

Among the non-conjugated dines mentioned above, 1,4-hexadiene, dicyclopentadiene and 5-ethylidene-2-norbornene may be mentioned as preferred ones.

A proportion of the non-conjugated diene used is preferably 0 to 10 mol % based on all the monomer components. If the proportion of the non-conjugated diene used exceeds 10 mol %, the durability of the resulting elastomer material may become low in some cases.

The specific functional group-containing copolymer generally has a weight average molecular weight Mw of 1,000 to 3,000,000, preferably 3,000 to 1,000,000, more preferably 5,000 to 700,000 in terms of polystyrene as measured by gel permeation chromatography (GPC).

The specific functional group-containing copolymer preferably has a melt flow rate (MFR) of 0.01 to 100 g/10 min, more preferably 0.05 to 50 g/10 min as measured under conditions that temperature is 230° C., and a load is 10 kg.

The glass transition temperature of the specific functional group-containing copolymer is preferably −90° C. to 50° C., particularly preferably −70 to 10° C.

The specific functional group-containing copolymer may also be an oil-extended polymer with a softening agent added upon the polymerization.

[Metal Ion]

The metal ion used in the present invention serves to form a crosslinked structure between molecules of the specific functional group-containing copolymer by ionic bond to a functional group in the specific functional group-containing copolymer. As examples of such a metal ion, may be mentioned ions of metals of Groups I to VIII in the periodic table, such as lithium, potassium, sodium, aluminum, magnesium, calcium, barium, cesium, strontium, rubidium, titanium, zinc, copper, iron, tin, lead and zirconium. Among these, metal ions of potassium, sodium, aluminum, magnesium, barium, zinc, iron, calcium, titanium, lead and zirconium are preferred.

[Other Component]

A polymeric compound selected from a thermoplastic resin, a thermoplastic elastomer and rubber may be incorporated into the specific elastomer material making up the automotive molding according to the present invention.

No particular limitation is imposed on such a polymeric compound so far as it is another compound than the specific functional group-containing copolymer, and various compounds may be used. Specific examples thereof include ionomers, aminoacrylamide polymers, polyethylene and maleic anhydride-grafted polymers thereof, polyisobutylene, ethylene-vinyl chloride polymers, ethylene-vinyl alcohol polymers, ethylene-vinyl acetate copolymers, polyethylene oxide, ethylene-acrylic acid copolymers, polypropylene and maleic anhydride-grafted polymers thereof, polyisibutylene and maleic anhydride-grafted polymers thereof, chlorinated polypropylene, 4-methylpentene-1 resins, polystyrene, ABS resins, ACS resins, AS resins, AES resins, ASA resins, MBS resins, acrylic resins, methacrylic resins, vinyl chloride resins, vinylidene chloride resins, polyamide resins, polycarbonate, acrylic resins, methacrylic resins, vinyl chloride resins, vinylidene chloride resins, vinyl alcohol resins, vinyl acetal resins, methyl methacrylate resins, fluororesins, polyether resins, polyethylene terephthalate, polyacrylates, polyamide resins, ethylene-α-olefin copolymer rubber and maleic anhydride-grafted polymers thereof, ethylene-α-olefin-non-conjugated diene terpolymer rubber, styrene-butadiene rubber and hydrogenated products thereof, maleic anhydride-grafted polymers of hydrogenated products of styrene-butadiene rubber, butadiene rubber and hydrogenated products thereof, maleic anhydride-grafted polymers of hydrogenated products of butadiene rubber, isoprene rubber and hydrogenated products thereof, maleic anhydride-grafted polymers of hydrogenated products of isoprene rubber, styrene-isoprene rubber and hydrogenated products thereof, maleic anhydride-grafted polymers of hydrogenated products of styrene-isoprene rubber, nitrile rubber and hydrogenated products thereof, acrylic rubber, silicone rubber, fluororubber, butyl rubber, natural rubber, chlorinated polyethylene type thermoplastic elastomers, syndiotactic 1,2-polybutadiene, hydrogenated products of styrene-butadiene block copolymers, hydrogenated products of styrene-isoprene block copolymers, simple blend type olefinic thermoplastic elastomers, in-plant type olefinic thermoplastic elastomers, dynamic crosslink type olefinic thermoplastic elastomers, polyvinyl chloride type thermoplastic elastomers, polyurethane type thermoplastic elastomers, polyester type thermoplastic elastomers, polyamide type thermoplastic elastomers and fluorine-containing thermoplastic elastomers. Polyethylene, polypropylene, hydrogenated products of styrene-butadiene rubber and hydrogenated products of butadiene rubber are particularly preferred. These polymeric compounds may be used either singly or in any combination thereof.

A proportion of the polymeric compound used is at most 300 parts by weight, preferably 1 to 200 parts by weight per 100 parts by weight of the specific functional group-containing copolymer.

A softening agent may be incorporated into the specific elastomer material.

This softening agent may be added to a monomer solution for obtaining the specific functional group-containing copolymer, or upon the preparation, or molding or forming of the specific elastomer material.

No particular limitation is imposed on such a softening agent so far as it is a softening agent for rubber generally used. Examples thereof include petroleum hydrocarbons such as paraffinic, naphthenic and aromatic hydrocarbons, and low-molecular weight hydrocarbons of polybutene and polybutadiene types. Among these, petroleum hydrocarbons are preferred, those having a molecular weight of 300 to 2,000, particularly 500 to 1,500 in terms of weight average molecular weight are preferred.

The softening agent for rubber composed of a petroleum hydrocarbon is generally a mixture of three hydrocarbons of an aromatic hydrocarbon, naphthenic hydrocarbon and paraffinic hydrocarbon. That, in which the number of carbon atoms in the paraffinic hydrocarbon occupies at least 50% of the total number of carbon atoms, is classified as paraffinic oil, that, in which the number of carbon atoms in the naphthenic hydrocarbon is 30 to 45% of the total number of carbon atoms, is classified as naphthenic oil, and that, in which the number of carbon atoms in the aromatic hydrocarbon is at least 30% of the total number of carbon atoms, is classified as aromatic oil. In the present invention, the paraffinic oil is preferred, with hydrogenated paraffinic oil being particularly preferred. The petroleum hydrocarbons preferably have a kinematic viscosity of 20 to 800 cSt, particularly 50 to 600 cSt at 40° C. and a pour point of −40 to 0° C., particularly −30 to 0° C.

A proportion of the softening agent used is at most 100 parts by weight, preferably 1 to 67 parts by weight per 100 parts by weight of the specific functional group-containing copolymer.

The specific elastomer material may further contain various kinds of additives, for example, lubricants, stabilizers such as antioxidants, heat stabilizers, weathering stabilizers, metal deactivators, ultraviolet absorbents, light stabilizers and copper inhibitors, antibacterial and mildewproofing agents, dispersing agents, plasticizers, nucleating agents, flame retarders, tackifiers, foaming aids, colorants such as titanium oxide and carbon black pigments, fillers, such as metal powder such as ferrite, inorganic fibers such as glass fiber and metal fiber, organic fibers such as carbon fiber and aramide fiber, composite fibers, inorganic whiskers such as potassium titanate whiskers, glass beads, glass balloons, glass flakes, asbestos, mica, calcium carbonate, talc, silica, alumina, alumina silica, calcium silicate, hydrotalcite, kaolin, diatomaceous earth, graphite, pumice, ebonite powder, cotton flock, cork powder, barium sulfate, and polymer beads, or mixtures thereof, fillers such as polyolefin waxes, cellulose powder, rubber powder and wood powder, and low-molecular weight polymers as needed.

[Specific Elastomer Material]

The specific elastomer material making up the automotive molding according to the present invention can be prepared in the following manner.

The specific functional group-containing copolymer formed by copolymerizing ethylene, the specific α-olefin and the functional group-containing unsaturated monomer, and optionally the non-conjugated diene is first prepared.

No particular limitation is imposed on the specific preparation process of the specific functional group-containing copolymer. However, the process described in Japanese Patent Application Laid-Open No. 2001-247629 may be preferably utilized.

The specific functional group-containing copolymer (hereinafter referred to as "Component (A)"), a metal compound (hereinafter referred to as "Component (B)"), which supplies the metal ion for crosslinking this Component (A), and the other components used as needed are mixed under proper conditions that a crosslinked structure can be formed by Component (A) and Component (B), whereby the specific elastomer material can be obtained.

As the metal compound making up Component (B), may be used a metal oxide, a metal hydroxide, a metal salt, an organic metal compound, a metal salt of a monovalent carboxylic acid, or the like.

Specific examples of the metal oxide used as Component (B) include CuO, MgO, BaO, ZnO, $Al_2O_3$, $Fe_2O_3$, SnO, CaO and $TiO_2$.

Specific examples of the metal hydroxide used as Component (B) include LiOH, NaOH, KOH, $Cu(OH)_2$, $Cu_2O(OH)_2$, $Mg(OH)_2$, $Mg_2O(OH)_2$, $Ba(OH)_2$, $Zn(OH)_2$, $Sn(OH)_2$ and $Ca(OH)_2$.

Specific examples of the organic metal compound used as Component (B) include organic aluminum compounds, organic titanium compounds, organic phosphorus compounds, organic boron compounds, organic zirconium compounds, organic gallium compounds, organic tin compounds, organic magnesium compounds, organic tellurium compounds, organic indium compounds, organic zinc compounds and organic vanadium compounds.

In the metal salt of the monovalent carboxylic acid used as Component (B), the carboxylic acid preferably has 3 to 23 carbon atoms. Specific examples of such a carboxylic acid include propionic acid, acrylic acid, lactic acid, methacrylic acid, valeric acid, hexanoic acid, octanoic acid, 2-ethylhexanoic acid, decanoic acid, palmitic acid, myristic acid, lauric acid, stearic acid, oleic acid, behenic acid, naphthenic acid and benzoic acid.

These metal compounds may be treated with a silane coupling agent or higher fatty acid for the purpose of improving their dispersibility in the specific functional group-containing copolymer that is Component (A).

These metal compounds may be used either singly or in any combination thereof.

A proportion of the metal compound used as Component (B) is generally 0.1 to 20 parts by weight, preferably 0.2 to 15 parts by weight, particularly 0.5 to 10 parts by weight per 100 parts by weight of the specific functional group-containing copolymer that is Component (A). If this proportion is lower than 0.1 parts by weight, the resulting elastomer material is low in crosslink density and tends to have low mechanical strength and scratching resistance. If the proportion exceeds 20 parts by weight on the other hand, the resulting elastomer material is too high in crosslink density and has a possibility that its flowability may be deteriorated. It is hence not preferable to use the metal compound in such a too low or high proportion.

As a method of mixing and crosslinking the above-described Component (A), Component (B) and other components used as needed, may be used various methods such as a method, in which solutions or dispersions of the respective components are prepared, and these solutions or dispersions are mixed, and a method using a melting and kneading device generally used. However, a method of mixing under heat is preferred in that a specific elastomer material having stable properties is obtained. As specific examples thereof, may be mentioned the following methods (I) and (II).

(I) A method, in which a solution with the specific functional group-containing copolymer that is Component (A) dissolved in a proper solvent, a solution or dispersion with the metal compound that is Component (B) dissolved or dispersed in the proper solvent, and a solution or dispersion with the other components used as needed, such as the polymeric compound (hereinafter referred to as "Component (C)") and the softening agent (hereinafter referred to as "Component (D)"), dissolved or dispersed are mixed under heat to crosslink the copolymer, or in which Component (A) is dissolved in a proper solvent, and the solution is heated while or after dissolving or dispersing Component (B) and the other components used as needed, such as Component (C) and Component (D), in the solvent.

(II) A method, in which the specific functional group-containing copolymer that is Component (A), the metal compound that is Component (B), and other components used as needed, such as Component (C) and Component (D), are mixed, and the resultant mixture is subjected to a dynamic heat treatment to crosslink the copolymer.

No particular limitation is imposed on the solvent used in the method (I). However, for example, an aliphatic hydrocarbon, alicyclic hydrocarbon, aromatic hydrocarbon or a halide thereof is preferably used in that the specific functional group-containing copolymer is easily dissolved. As specific examples thereof, may be mentioned butane, pentane, hexane, heptane, 2-butane, 2-methyl-2-butane, cyclopentane, methylcyclopentane, cyclohexane, isooctane, benzene, toluene, xylene, chlorobenzene, dichloromethane and dichloroethane.

When the solubility of Component (B) used in the solvent is low, a dispersion with Component (B) dispersed in a suspended state in the solvent may be prepared. Alternatively, another solvent or additive may be added for dissolving Component (B).

When the solubility of Component (C) and Component (D) used in the solvent is low, a dispersion with Component (C) and Component (D) dispersed in a suspended state in the solvent may be prepared, another solvent or additive may be added for dissolving Component (C) and Component (D), or Component (C) and Component (D) may be added after the solvent is removed, and the resultant mixture may be subjected to a dynamic heat treatment.

A proportion of the specific functional group-containing copolymer in the solution is preferably 0.1 to 60% by weight, more preferably 0.2 to 50% by weight.

A proportion of Component (B) and the activator in the solution or dispersion is preferably 0.01 to 60% by weight, more preferably 0.05 to 50% by weight in total of both components.

The mixing of the solutions and/or dispersions may be conducted by a solution-stirring device generally used. The temperature upon mixing is preferably at least 20° C., more preferably at least 30° C.

Upon mixing of the solutions and/or dispersions, a suitable catalyst may be added for accelerating the crosslinking reaction.

In the method (II), the term "dynamic heat treatment" means a treatment that both shearing force-applying treatment and heat treatment are conducted. Such dynamic heat treatment may be conducted by means of, for example, a melting and kneading apparatus. This melting and kneading apparatus may be either of a batch type or of a continuous type. As specific examples of the melting and kneading apparatus, may be mentioned batch type melting and kneading apparatus such as an open mixing mill, internal Banbury mixer and kneader, and continuous type melting and kneading apparatus such as a single screw extruder, same direction-rotating type continuous twin screw extruder and different direction-rotating type continuous twin screw extruder.

As examples of specific methods, may be mentioned the following methods (II-1) and (II-2).

(II-1) A method, in which a mixture containing the specific functional group-containing copolymer that is Component (A), the metal compound that is Component (B), and the other components used as needed, such as Component (C) and Component (D), is subjected to a dynamic heat treatment by heat generated by continuous shearing by means of a twin screw extruder to crosslink the copolymer, thereby preparing the specific elastomer material.

(II-2) A method, in which a mixture containing the specific functional group-containing copolymer that is Component (A) the metal compound that is Component (B), and the other components used as needed, such as Component (C) and Component (D), is subjected to a dynamic heat treatment by heat generated by shearing by means of a batch type kneader to crosslink the copolymer, thereby preparing the specific elastomer material.

Treatment conditions in the dynamic heat treatment vary according to the melting point of the specific functional group-containing copolymer used as Component (A), the kind of the metal compound used as Component (B), the melting point of the polymeric compound used as Component (C), the kind of the melting and kneading apparatus, etc. However, the treatment temperature is 120 to 350° C., preferably 150 to 290° C., and the treatment time is 20 seconds to 320 minutes, preferably 30 seconds to 25 minutes. The shearing force applied to the mixture is 10 to 20,000/sec, preferably 100 to 10,000/sec in terms of shear rate.

The specific elastomer material obtained in such a manner preferably has a melt flow rate (MFR) of at least 0.5 g/10 min, particularly 1 g/10 min as measured under conditions that temperature is 230° C., and a load is 10 kg, a permanent set of at most 30%, particularly at most 25%, and a durometer A hardness of at most 96, particularly at most 90.

[Automotive Molding]

The automotive molding according to the present invention has a part composed of the specific elastomer material, and the whole or only a part thereof may be formed of the specific elastomer material. In the automotive molding, only a part of which is formed of the specific elastomer material, the part formed of the specific elastomer material may be any of, for example, a core material, intermediate layer and facing material. However, the effects of the present invention are sufficiently exhibited when the facing material is composed of the specific elastomer material, since the specific elastomer material has excellent weathering resistance and scratching resistance and high gloss.

The thickness of such a facing material is preferably 0.01 to 10 mm, particularly preferably 0.02 to 1 mm.

When the facing material is formed by the specific elastomer material, as a base material, on which the facing material is formed, may be used that composed of rubber, a plastic, a thermoplastic elastomer, glass, a metal, cloth or wood.

Examples of the rubber include ethylene-α-olefin copolymer rubber and maleic anhydride-grafted polymers thereof, ethylene-α-olefin-non-conjugated diene terpolymer rubber, styrene-butadiene rubber, butadiene rubber, isoprene rubber, nitrile rubber and hydrogenated products thereof, acrylic rubber, silicone rubber, fluororubber, butyl rubber, and natural rubber.

Examples of the plastic include ionomers, aminoacrylamide polymers, polyethylene and maleic anhydride-grafted polymers thereof, polyisobutylene, ethylene-vinyl chloride polymers, ethylene-vinyl alcohol polymers, ethylene-vinyl acetate copolymers, polyethylene oxide, ethylene-acrylic acid copolymers, polypropylene and maleic anhydride-grafted polymers thereof, polyisibutylene and maleic anhydride-grafted polymers thereof, chlorinated polypropylene, 4-methylpentene-1 resins, polystyrene, ABS resins, ACS resins, AS resins, AES resins, ASA resins, MBS resins, acrylic resins, methacrylic resins, vinyl chloride resins, vinylidene chloride resins, polyamide resins, polycarbonate, acrylic resins, methacrylic resins, vinyl chloride resins, vinylidene chloride resins, vinyl alcohol resins, vinyl acetal resins, methyl methacrylate resins, fluororesins, polyether resins, polyethylene terephthalate, polyacrylates, polyamide resins, polyurethane, polyimide, polyurea resins, epoxy resins, phenol resins, urea resins, polybutene-1, methylpentene resins, and polyacrylonitrile.

Examples of the thermoplastic elastomer include chlorinated polyethylene type thermoplastic elastomers, syndiotactic 1,2-polybutadiene, simple blend type olefinic thermoplastic elastomers, in-plant type olefinic thermoplastic elastomers, dynamic crosslink type olefinic thermoplastic elastomers, polyvinyl chloride type thermoplastic elastomers, polyurethane type thermoplastic elastomers, polyester type thermoplastic elastomers, polyamide type thermoplastic elastomers, fluorine-containing thermoplastic elastomers, hydrogenated products of styrene-butadiene rubber, maleic anhydride-grafted polymers of hydrogenated products of styrene-butadiene rubber, hydrogenated products of butadiene rubber, maleic anhydride-grafted polymers of hydrogenated products of butadiene rubber, hydrogenated products of isoprene rubber, maleic anhydride-grafted polymers of hydrogenated products of isoprene rubber, hydrogenated products of styrene-isoprene rubber, maleic anhydride-grafted polymers of hydrogenated products of styrene-isoprene rubber, hydrogenated products of styrene-butadiene block copolymers, and hydrogenated products of styrene-isoprene block copolymers.

Examples of the metal include stainless steel, aluminum, iron, copper, nickel, zinc, lead, tin, and alloys used in automobiles, ships and household electric appliances, such as nickel-zinc alloys, iron-zinc alloys and lead-tin alloys.

The facing material can be obtained by molding or forming the specific elastomer material. However, it can also be obtained by conducting a step of preparing the specific elastomer material by mixing the above-described Component (A), Component (B) and the other components used as needed under proper conditions that a crosslinked structure is formed by Component (A) and Component (B) and a molding or forming step by a single process.

No particular limitation is imposed on the molding or forming method, and various methods used as methods for molding or forming, for example, a thermoplastic resin may be adopted. However, extrusion, calendaring, solvent casting, injection molding, vacuum forming, powder slash molding and hot pressing may be suitably used. Among these, extrusion, injection molding and solvent casting are particularly preferred.

In the melting and molding forming methods such as extrusion and injection molding, the forming or molding temperature is suitably preset according to the melting points of the specific functional group-containing copolymer and polymeric compound making up the specific elastomer material, the kind of the forming or molding machine used, and the like. However, it is generally 120 to 350° C.

When a base material, which will become a lower layer, is composed of a thermoplastic resin or thermoplastic elastomer in the case where the extrusion is used, a facing material may be formed by extruding the specific elastomer material on the surface of a base material produced in advance. However, the base material, which will become a lower layer, and the facing material may be formed at the same time in the interior of an extrusion die by connecting at least 2 extruders to the die, supplying the thermoplastic resin and the specific elastomer material to one extruder and the other extruder, respectively, and operating both extruders at the same time. Such a method is described in, for example, Japanese Patent Application Laid-Open No. 2001-10418.

When a base material, which will become a lower layer, is composed of a thermoplastic resin or thermoplastic elastomer in the case where the injection molding is used, a facing material may be formed by arranging a base material produced in advance in a mold and injection-molding the specific elastomer material. However, the base material, which will become a lower layer, and the facing material may be formed continuously in a mold by using 2 injection molding machines and the mold, supplying the specific elastomer material and the thermoplastic resin to one injection molding machine and the other injection molding machine, respectively, and continuously operating both injection molding machines.

No particular limitation is imposed on a solvent used in the solvent casting so far as it can dissolve the specific elastomer material. However, for example, an aliphatic hydrocarbon, an alicyclic hydrocarbon, an aromatic hydrocarbon or a halide thereof is preferably used. As specific examples thereof, may be mentioned butane, pentane, hexane, heptane, 2-butane, 2-methyl-2-butane, cyclopentane, methylcyclopentane, cyclohexane, isooctane, benzene, toluene, xylene, chlorobenzene, dichloromethane and dichloroethane.

Examples of processes of the solvent casting include a process, in which the respective components are dissolved or dispersed in a proper solvent, the resulting solution or dispersion is cast to remove the solvent, and crosslinking is conducted under heat, a process, in which heating is conducted after the casting, thereby performing removal of the solvent and crosslinking at the same time, a process, in which a solution with the specific functional group-containing copolymer that is Component (A) dissolved in a proper solvent, a solution or dispersion with the metal compound that is Component (B) dissolved or dispersed in the proper solvent, and a solution or dispersion with the other components used as needed, such as Component (C) and Component (D), dissolved or dispersed are mixed, the resultant liquid mixture is cast to remove the solvent, and crosslinking is then conducted under heat, and a process, in which heating is conducted after the casting, thereby performing removal of the solvent and crosslinking at the same time.

Since the automotive molding according to the present invention is formed by the specific elastomer material having excellent scratching resistance and weathering resistance, high gloss, and moreover good rubber elasticity and mechanical properties, it can preferably be applied to a door belt molding, side molding, step molding, roof molding, roof drip molding, front window molding, quarter window molding, hood top molding or bumper molding.

EXAMPLES

The present invention will hereinafter be described specifically by the following Examples. However, the present invention is not limited thereto.

Respective components used in the following Examples and Comparative Examples are as follows.

[Olefinic Random Copolymer]

(1) Specific Functional Group-containing Copolymer (A-1):

A specific functional group-containing copolymer wherein a content of a structural unit derived from ethylene is 86.1 mol %, a content of a structural unit derived from propylene is 10.6 mol %, a content of a structural unit derived from 5-ethylidene-2-norbornene is 2.6 mol %, and a content of a structural unit derived from 5-methyl-5-carboxy-bicyclo[2.2.1]-2-heptene is 0.7 mol %, and its weight average molecular weight (Mw) is $16.5 \times 10^4$.

[Metal Compound]

(1) Metal Compound (B-1):

Magnesium hydroxide (product of Kyowa Chemical Industry Co., Ltd.; trade name "Kisuma 5N") surface-treated with a silane coupling agent.

(2) Metal Compound (B-2):

Magnesium stearate.

[Polymeric Compound]

(1) Polyethylene Resin (C-1):

A high density polyethylene resin (product of Japan Polychem Corp.; trade name "Novatec HDPE HJ490") having an MFR (temperature: 190° C., load: 2.16 kg) of 20 g/10 min.

(2) Polypropylene Resin (C-2):

A polypropylene resin (product of Chisso Corporation; trade name "XF9520") having an MFR (temperature: 230° C., load: 2.16 kg) of 20 g/10 min.

[Other Additives]

Antioxidant (D-1):

2-[1-(2-Hydroxy-3,5-di-t-pentylphenyl)ethyl]-4,6-di-t-pentylphenyl acrylate (product of Sumitomo Chemical Co., Ltd.; trade name "Sumilizer GS").

Colorant (E-1):

Carbon black master batch (polypropylene resin base, carbon black content: 30% by weight, product of Dainichiseika Color & Chemicals Mfg. Co., Ltd.; trade name "PPM-77255").

Example 1

[Preparation of Specific Elastomer Material]

A 10-L double arm pressure kneader (manufactured by Moriyama Company Ltd.) was charged with 100 parts by weight of the specific functional group-containing copolymer (A-1), 1.5 parts by weight of the metal compound (B-1), 6.0 parts by weight of the metal compound (B-2), 20 parts by weight of the polyethylene resin (C-1), 7 parts by weight of the polypropylene resin (C-2), 0.3 parts by weight of the antioxidant (D-1) and 1.7 parts by weight of the colorant (E-1) each heated to 230° C., and the contents were kneaded for 20 minutes at 40 rpm (shear rate: 200 $\text{sec}^{-1}$). The resultant massive kneaded product in a molten state was then granulated by a feeder rudder (manufactured by Moriyama Company Ltd.) preset to 180° C. and 40 rpm to obtain palletized specific elastomer material.

[Evaluation of Specific Elastomer Material]

With respect to the resultant specific elastomer material, its melt flow rate (MFR) was measured as an index to flowability under conditions of a temperature of 230° C. and a load of 10 kg. The result thereof is shown in Table 1.

Pellets of the resultant specific elastomer material were press-molded by means of an electric heating pressure press molding machine (manufactured by Kansai Roll Co., Ltd.) under conditions that the mold temperature is 180° C., the pressurizing and heating time is 10 minutes, and the pressurizing and cooling time is 5 minutes, thereby obtaining a sheet having a thickness of 2 mm, a length of 120 mm and a width of 120 mm. This sheet was used to measure durometer A hardness as an index to softness, permanent set as an index to rubber elasticity, tensile strength at break and tensile elongation at break as mechanical strength, and specific gravity in accordance with the following respective methods. The results thereof are shown in Table 1.

(1) Durometer A hardness: measured in accordance with JIS K 6253.
(2) Permanent set: measured in accordance with JIS K 6262.
(3) Tensile strength at break and tensile elongation at break: measured in accordance with JIS K 6251.
(4) Specific gravity: measured in accordance with JIS K 7112.

[Production of Automotive Molding]

An extrusion die for producing an automotive molding, a first extruder (manufactured by Ikegai Corp.; model "FS-40") and a second extruder (manufactured by Ikegai Corp.; model "VS25-25H") were provided, and both first and second extruders were connected to the die. The screw of the first extruder is a single Dulmage screw, and a ratio L/D of the length L of a screw flight part to the diameter D of the screw is 25. The screw of the second extruder is a single full-flight screw, and a ratio L/D of the length L of a screw flight part to the diameter D of the screw is 25.

The temperature of the cylinder in each extruder was set to 210° C., the polypropylene resin (C-2) was supplied to the first extruder, the specific elastomer material was supplied to the second extruder, and the respective extruders were operated, whereby the polypropylene resin (C-2) and specific elastomer material heated and melted were respectively poured into the die to produce a laminate with a facing material composed of the specific elastomer material and having a thickness of 0.5 mm formed on the surface of a base material composed of the polypropylene resin (C-2) and having a width of 25 mm and a thickness of 2 mm. After the resultant laminate was cooled by conveying it by a belt conveyor equipped with a water sprayer, the laminate was cut into prescribed dimensions, thereby producing an automotive molding.

[Evaluation of Automotive Molding]

With respect to the resultant automotive molding, the weathering resistance and surface gloss were determined in accordance with the following respective methods, and the following scratching resistance test 1 and scratching resistance test 2 were conducted. The results thereof are shown in Table 1.

(1) Weathering Resistance:

A weathering resistance test was conducted by an ultra-accelerated weathering resistance tester "Metal Weather" manufactured by Daipla wintes Co., Ltd. under conditions of light quantity at 80 mW/cm$^2$, and 256 hours in total in a cycle of 4 hours by a light mode (63° C., relative humidity 50%) and 20 seconds by a dark mode (30° C., relative humidity 98%) and 20 seconds by a shower mode, (conditions equivalent to 2000 hours in sunshine weather meter) and the surface condition of the facing material was ranked visually in accordance with the following standard:

○: No crack was observed;
x: Cracks were observed.

(2) Gloss:

Degree of gloss was measured by means of a gloss meter ("GM-26D" manufactured by Murakami Saishoku Gijutsu Kenkyusho K.K.) under conditions of an incident angle of 60°.

(3) Scratching Resistance Test 1:

A metal claw (material: tungsten carbide), to which a load of 10 g was applied, was scanned on the surface of the sheet by means of a Taber scratch tester manufactured by Toyo Seiki Seisakusho, Ltd. This process was repeated while increasing the load 10 g by 10 g until the surface of the formed sheet was scratched, thereby recording the value of the load at the time the surface of the formed sheet had been scratched. In this test, the greater value of the load recorded indicates that the scratching resistance is excellent.

(4) Scratching Resistance Test 2:

The surface of the sheet was rubbed by a thumbnail, and the degree of scratch was ranked visually in accordance with the following standard:

1: No scratch was observed;
2: The surface was slightly scratched, but the scratched surface was immediately restored;
3: The surface was slightly scratched;
4: The surface was deeply scratched.

Example 2

An automotive molding was produced in the same manner as in Example 1 except that a thermoplastic elastomer (dynamic crosslink type olefinic thermoplastic elastomer "MILASTOMER 7030B", product of Mitsui Chemicals, Inc.) was supplied to the first extruder in place of the polypropylene resin (C-2) in the production of the automotive molding, and its evaluation was made. The results are shown in Table 1.

Example 3

In order to produce an automotive molding, the cylinder temperature of an extruder (manufactured by Ikegai Corp.; model "FS-40", single Dulmage screw, a ratio L/D of the length L of a screw flight part to the diameter D of the screw: 25) was preset to 210° C., the specific elastomer material prepared in the same manner as in Example 1 was supplied to this extruder, and a belt made (width: 25 mm, thickness: 2 mm) of stainless steel (SUS304) was supplied to an extrusion die to produce a laminate with a facing material composed of the specific elastomer material and having a thickness of 0.5 mm formed on the surface of a base material composed of the stainless steel. After the resultant laminate was cooled by conveying it by a belt conveyor equipped with a water sprayer, the laminate was cut into prescribed dimensions, thereby producing an automotive molding. The evaluation thereof was conducted in the same manner as in Example 1. The results are shown in Table 1.

Comparative Example 1

A 10-L double arm pressure kneader (manufactured by Moriyama Company Ltd.) was charged with 100 parts by weight of the specific functional group-containing copolymer (A-1), 0.3 parts by weight of the antioxidant (D-1) and 1.7 parts by weight of the colorant (E-1) each heated to 230° C., and the contents were kneaded for 20 minutes at 40 rpm (shear rate: 200 sec$^{-1}$). The resultant massive kneaded product in a molten state was then granulated by a feeder rudder (manufactured by Moriyama Company Ltd.) preset to 180° C. and 40 rpm to obtain palletized elastomer material (hereinafter referred to as "comparative elastomer material").

Pellets of the resultant comparative elastomer material were press-molded by means of an electric heating pressure press molding machine (manufactured by Kansai Roll Co., Ltd.) under conditions that the mold temperature is 180° C., the pressurizing and heating time is 10 minutes, and the pressurizing and cooling time is 5 minutes, thereby obtaining an olefinic thermoplastic elastomer sheet having a thickness of 2 mm, a length of 120 mm and a width of 120 mm. This olefinic thermoplastic elastomer sheet was evaluated in the same manner as in Example 1. The results are shown in Table 1.

An automotive molding was produced in the same manner as in Example 1 except that a thermoplastic elastomer (dynamic crosslink type olefinic thermoplastic elastomer "MILASTOMER 7030B", product of Mitsui Chemicals, Inc.) was supplied to the first extruder in place of the polypropylene resin (C-2), and the comparative elastomer material was supplied to the second extruder in place of the specific elastomer material, and its evaluation was made. The results are shown in Table 1.

fin having 3 to 10 carbon atoms and an unsaturated monomer having a functional group, and optionally a non-conjugated diene, and a metal ion for crosslinking the olefinic random copolymer.

2. The automotive molding according to claim 1, wherein the unsaturated monomer having a functional group for obtaining the olefinic random copolymer is a functional cyclic compound represented by the following general formula (1):

General formula (1)

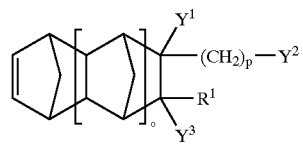

wherein in the general formula (1), $R^1$ means a hydrogen atom or a hydrocarbon group having 1 to 10 carbon atoms, $Y^1$, $Y^2$ and $Y^3$ denote, independently of one another, a hydrogen atom, a hydrocarbon group having 1 to 10 carbon atoms or —COOH, with the proviso that at least one of $Y^1$, $Y^2$ and $Y^3$ is —COOH, and when at least two of $Y^1$, $Y^2$ and $Y^3$ are —COOH, they may be bonded to each other to form an acid anhydride (—CO—(O)—CO—), o is an integer of 0 to 2, and p is an integer of 0 to 5.

3. The automotive molding according to claim 2, wherein, in the monomer components for the olefinic random copolymer, a proportion of ethylene is 35 to 94.99 mol %, a

TABLE 1

| | | Example 1 | Example 2 | Example 3 | Comparative Example 1 |
|---|---|---|---|---|---|
| Combination of materials (parts by weight) | Specific functional group-containing copolymer (A-1) | 100 | 100 | 100 | 100 |
| | Metal compound (B-1) | 1.5 | 1.5 | 1.5 | — |
| | Metal compound (B-2) | 6 | 6 | 6 | — |
| | Polyethylene resin (C-1) | 20 | 20 | 20 | — |
| | Polypropylene resin (C-2) | 7 | 7 | 7 | — |
| | Antioxidant (D-1) | 0.3 | 0.3 | 0.3 | 0.3 |
| | Colorant (E-1) | 1.7 | 1.7 | 1.7 | 1.7 |
| | Material type | Polypropylene | Thermoplastic elastomer | Stainless steel | Thermoplastic elastomer |
| Results of evaluation | MFR (230° C., 10 kg) [g/10 min] | 13 | 13 | 13 | 1 |
| | Durometer A hardness | 78 | 78 | 78 | 64 |
| | Permanent set [%] | 6 | 6 | 6 | 8 |
| | Tensile strength at break [MPa] | 15.6 | 15.6 | 15.6 | 8 |
| | Tensile elongation at break [%] | 840 | 840 | 840 | 1000 |
| | Specific gravity | 0.9 | 0.9 | 0.9 | 0.89 |
| | Weathering resistance test | ○ | ○ | ○ | ○ |
| | Gloss | 27 | 27 | 27 | 20 |
| | Scratching resistance test 1 [g] | 130 | 110 | 140 | 10 |
| | Scratching resistance test 2 | 1 | 1 | 1 | 4 |

As apparent from the results shown in Table 1, it is understood that the automotive moldings according to Examples 1 to 3 are excellent even in weathering resistance and scratching resistance and have high gloss.

What is claimed is:

1. An automotive molding comprising a part composed of an elastomer material comprising an olefinic random copolymer obtained by copolymerizing ethylene, an α-olefin having 3 to 10 carbon atoms and an unsaturated monomer having a functional group, and optionally a non-conjugated diene, and a metal ion for crosslinking the olefinic random copolymer.

proportion of the α-olefin having 3 to 10 carbon atoms is 5 to 50 mol %, and a proportion of the non-conjugated diene is 0 to 10 mol %.

4. The automotive molding according to claim 3, wherein a proportion of metal compounds for supplying metal ions is 0.1 to 20 parts by weight per 100 parts by weight of the olefinic random copolymer.

5. The automotive molding according to claim 2, wherein the olefinic random copolymer has a weight average molecular weight of 1,000 to 3,000,000 in terms of polystyrene as measured by gel permeation chromatography, a melt flow rate of 0.01 to 100 g/10 mm as measured under conditions of temperature 230° C. and a load 10 kg, and a glass transition temperature of −90° C. to 50° C.

6. The automotive molding according to claim 1, wherein the elastomer material further comprises a polymeric compound selected from the group consisting of a thermoplastic resin, a thermoplastic elastomer and rubber and/or a softening agent.

7. The automotive molding according to claim 6, wherein a proportion of the polymeric compound is 1 to 200 parts by weight per 100 parts by weight of the olefinic random copolymer.

8. The automotive molding according to claim 7, wherein a proportion of the softening agent is 1 to 67 parts by weight per 100 parts by weight of the olefinic random copolymer.

9. The automotive molding according to claim 1, wherein the part composed of the elastomer material is a facing material.

10. The automotive molding according to claim 9, wherein a thickness of the facing material is 0.01 to 10 mm.

11. The automotive molding according to claim 9, wherein a base material, on which the facing material is formed, is composed of rubber, a plastic, a thermoplastic elastomer, glass, a metal, cloth or wood.

12. The automotive molding according to claim 1, which is a door belt molding, side molding, step molding, roof molding, roof drip molding, front window molding, quarter window molding, hood top molding, rear window molding, glass run channel or bumper molding.

13. The automotive molding according to claim 3, wherein the olefinic random copolymer has a weight average molecular weight of 1,000 to 3,000,000 in terms of polystyrene as measured by gel permeation chromatography, a melt flow rate of 0.01 to 100 g/10 mm as measured under conditions of temperature 230° C. and a load 10 kg, and a glass transition temperature of −90° C. to 50° C.

14. The automotive molding according to claim 2, wherein the elastomer material further comprises a polymeric compound selected from the group consisting of a thermoplastic resin, a thermoplastic elastomer and rubber and/or a softening agent.

15. The automotive molding according to claim 2, wherein the part composed of the elastomer material is a facing material.

16. The automotive molding according to claim 2, which is a door belt molding, side molding, step molding, roof molding, roof drip molding, front window molding, quarter window molding, hood top molding, rear window molding, glass run channel or bumper molding.

* * * * *